United States Patent [19]
Kim

[11] Patent Number: 5,998,946
[45] Date of Patent: Dec. 7, 1999

[54] METHOD AND APPARATUS FOR CONTROLLING A ROTATION OF A SENSORLESS AND BRUSHLESS DC MOTOR

[75] Inventor: Hyung-Cheol Kim, Kyeongki-Do, Rep. of Korea

[73] Assignee: Daewoo Electronics Co., Ltd., Seoul, Rep. of Korea

[21] Appl. No.: 09/092,920

[22] Filed: Jun. 8, 1998

[30] Foreign Application Priority Data

Oct. 8, 1997 [KR] Rep. of Korea ........................ 97-51495
Oct. 8, 1997 [KR] Rep. of Korea ........................ 97-51496

[51] Int. Cl.$^6$ .................................................. H02K 29/00
[52] U.S. Cl. .......................... 318/254; 318/138; 318/439
[58] Field of Search ........................... 318/138, 245–254, 318/439

[56] References Cited

U.S. PATENT DOCUMENTS

| | | | |
|---|---|---|---|
| 4,992,710 | 2/1991 | Cassat ...................................... | 318/254 |
| 5,001,405 | 3/1991 | Cassat ...................................... | 318/254 |
| 5,028,852 | 7/1991 | Dunfield ................................... | 318/254 |
| 5,117,165 | 5/1992 | Cassat et al. ............................ | 318/254 |
| 5,225,746 | 7/1993 | von der Heide et al. .............. | 318/254 |
| 5,254,914 | 10/1993 | Dunfield et al. ......................... | 318/254 |
| 5,254,918 | 10/1993 | Ueki ......................................... | 318/466 |

FOREIGN PATENT DOCUMENTS

0 490 395 6/1992 European Pat. Off. .
97/11524 3/1997 WIPO .

*Primary Examiner*—Paul Ip
*Attorney, Agent, or Firm*—Pillsbury Madison & Sutro

[57] ABSTRACT

A method and an apparatus for controlling a rotation of a sensorless and brushless DC motor is disclosed. A switching-driving section provides a driving current to each of pairs of phase coils of the motor in order to rotate a rotor of the motor, and provides a test current to each of pairs of the phase coils in order to detect a present position of the rotor. A back electromotive force detector detects a back electromotive force generated from each of pairs of the driven phase coils during a high-speed rotation of the rotor. Position detecting section detects a test or driving current flowing through each of pairs of the driven phase coils during a low-speed rotation of the rotor, and provides a parallel voltage signal of a digital level. Speed detecting section provides a mode selection signal according to a speed of the rotor in response to the back electromotive force signal detected by the back electromotive force detector. Control section provides a low-speed control signal to the switching-driving section in response to the detected voltage signal below a predetermined speed on the basis of the mode selection signal, and for provides a high-speed control signal to the switching-driving section in response to the detected back electromotive force signal above a predetermined speed on the basis of the mode selection signal. Consequently, although the rotational velocity of the motor varies between low and high velocities, the phase coils are supplied with an optimal driving current at an optimal point in time under the control of the control section, so that the driving characteristics of the motor are improved.

17 Claims, 10 Drawing Sheets

METHOD AND APPARATUS FOR CONTROLLING A ROTATION OF A SENSORLESS AND BRUSHLESS DC MOTOR

BACKGROUND OF THE INVENTION

1. Field of the Invention

The present invention relates to a control method and an apparatus wherein when controlling a driving of a sensorless and brushless DC motor, a present angular position of a rotor is correctly detected to heighten the reliability controlling a motor rotation, and an optimal driving current is provided to phase coils of the motor at an optimal point in time to improve the driving characteristics of the motor.

2. Description of the Prior Art

Generally, a sensorless and brushless motor is applied as a head drum assembly which is utilized for recording the video signals onto the tape and for reproducing the recorded video signals or as a capstan motor which is utilized for traveling the magnetic tape at a constant velocity.

Figure 1:
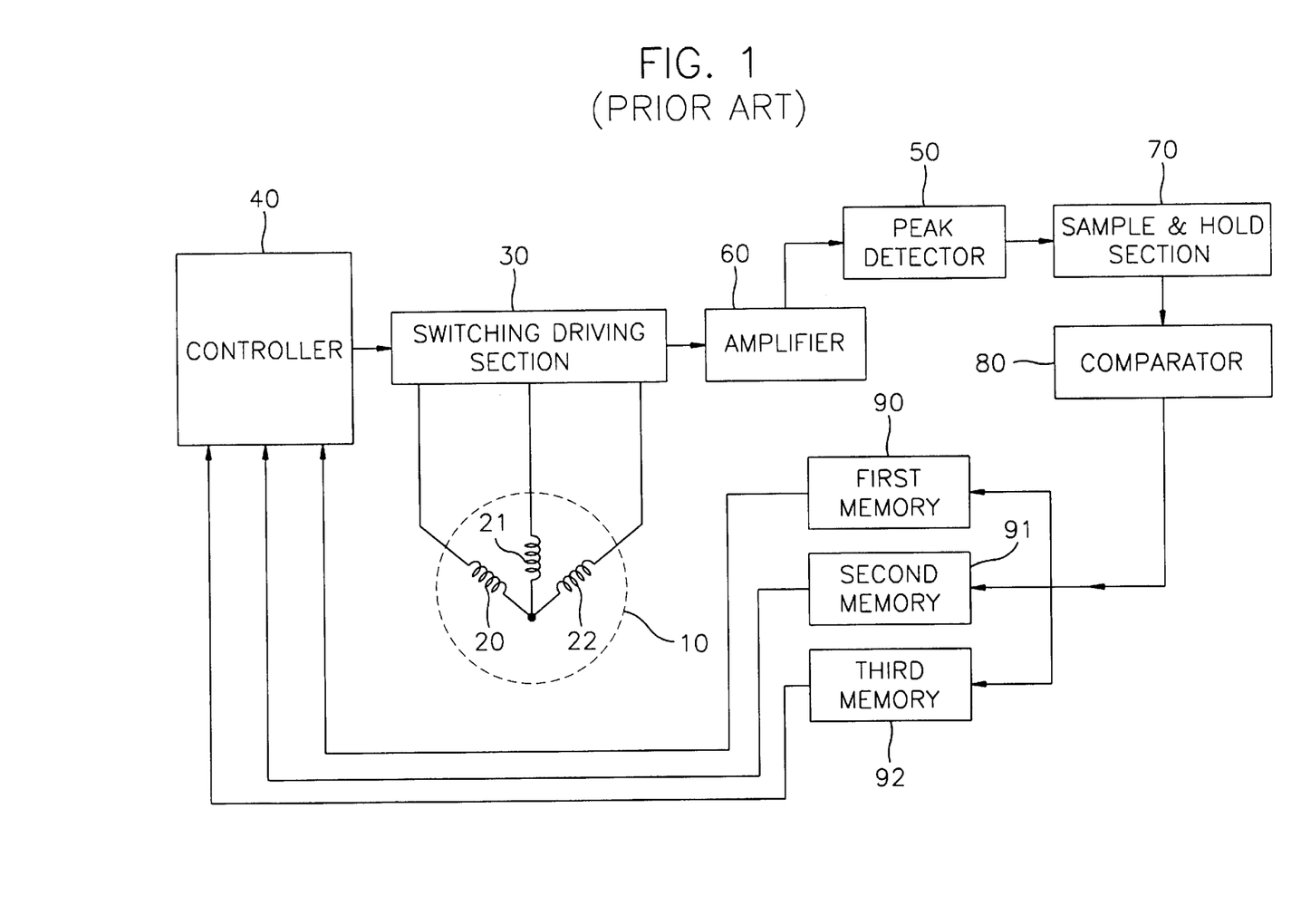
FIG. 1 is a block diagram for showing a circuit configuration of a conventional apparatus for controlling a rotation of a sensorless and brushless DC motor.

FIG. 1 is block diagram for showing a configuration of a conventional circuit section for controlling a position of a sensorless and brushless DC motor. As shown in FIG. 1, the position control circuit section includes a switching section 30 which supplies Y-winding three phases of motor coils (hereinafter, referred to as "Y-winding three phase coils") 20, 21 and 22 with a test current for detecting the variation of inductances, i.e., a rotational position of a magnet rotor, of three phase coils 20, 21 and 22 included in motor 10, and with a driving current for rotating the magnet rotor.

In order to drive a switching-driving section 30, a controller 40 provides a pilot signal which is a train of square-waves having a short period to switching-driving-section 30.

When the test current is provided to a phase coil of three phase coils 20, 21 and 22 to which the driving current from switching-driving section 30 is not provided, i.e., in relation to the rotation of the magnet rotor, and which is inactive, a peak detector 50 detects a peak value of the test current which varies in accordance with the inductance variation of the phase coil. Then, since the inductance variation is very small, the variation of the test current is also very small. Therefore, before peak detector 50 detects the peak value of the test current, the varied test current is amplified by an amplifier 60.

The peak values of first and second test currents which are detected by peak detector 50 for each of the phase coils at first and second predetermined points in time are held for a time by a sample & hold section 70 independent of the variation of the first and second peak values.

The first and second peak values which are held by sample & hold section 70 are compared to each other by a comparator 80 and only a largest peak value is selected. The peak values which are selected by comparator 80 are stored in designated memory locations of first, second and third memories 90, 91 and 92.

Hereafter, a controller 40 reads and fetches the peak values which are recorded in first, second and third memories 90, 91 and 92 and determines a present location of the magnet rotor on the basis of the fetched peak values. According to a commutation scheme, controller 40 provides a corresponding driving control signal to switching-driving section 30 so that the rotor rotates in a desired direction by up to a desired angle in accordance with a commutation scheme for running the motor based on a determined rotor position.

As an example of the apparatus for controlling the rotation of the brushless motor, U.S. Pat. No. 5,382,890 discloses an integrated circuit driver for the brushless motor having an encoder which includes a plurality of Hall-effect sensors operative for providing commutation information to a motor controller. The driver includes a commutation decoding section for decoding the commutation information from the Hall-effect sensors and an analog current limiter.

In the above conventional apparatus for controlling the position of the motor, while the motor is rotating at a high velocity, controller 40 receives the information, which is necessary to control the rotational position, via sensors such as the Hall-effect sensors or extracts such information from a back electromotive force which is generated from phase coils 20, 21 and 22 during the rotation of the magnet rotor.

Meanwhile, the more slower motor 10 rotates, the smaller the value of the back electromotive force or an output from the sensor becomes, so that those sensed signals are difficult to use for detecting a correct rotor position. Namely, since a reliability of the control considerably decreases at a low velocity, only a control of a transient state, i.e., a coercive driving, for boosting the velocity of motor 10 to a high velocity is executed. The peak values which are selected by comparator 80 are stored into first, second and third memories 90, 91 and 92.

In a control system for the purpose of a low-speed control, an algorithm for determining a rotor position is utilized and thereby, the reliability to the low-speed control is in a high level, whereas in a high-speed mode, this system is not adapted to a control for high-speed rotation of the motor due to a time which is spent on determining a position of the rotor.

Further, in the above apparatus for controlling the position or the rotational velocity of sensorless and brushless DC motor 10, since the test current has to be amplified by amplifier 60 before the peak values of a small test current are detected by peak detector 50, and since the peak values have to be held for a time by sample & hold section 70 before the peak values of the test current detected by the first and second peak detectors are provided to comparator 80, a circuit configuration thereof becomes complicated. If amplifier 60 is not included in the apparatus, one of the peak values of the test current is not differentiated from the other peak values, so that a reliability of the operation of controller 40 for determining the rotor position considerably decreases.

Also, since those memories into which the peak values selected by comparator 80 are stored have relatively high prices, a unit cost of manufacturing the circuit for controlling the rotation of the motor increases.

SUMMARY OF THE INVENTION

Therefore, it is a first object of the present invention to at least partially mitigate disadvantages of the prior art.

It is a second object of the present invention to provide a method and an apparatus wherein when a control objective value such as a rotational speed of a sensorless and brushless DC motor is given, low- and high-speed mode control sections respectively operate in response to low- and high-speed rotation modes, and executes both an operation of determining a rotational position of a rotor included in the motor and another operation of following the control objective value.

It is a third object of the present invention to provide a method and apparatus which detects the inductance variation of phase coils with respect to a test current which is provided to a motor driving section in order to control the position control of the sensorless and brushless DC motor, and then, detects a present rotational position of the rotor, and performs a correct electrical commutation, i.e., a driving sequence, of the phase coils of the motor based on a detected position.

It is a fourth object of the present invention to provide a method and an apparatus which optimally performs the commutation in response to the control objective value for the motor and to the present rotational position of the motor and increases a control reliability.

In order to achieve the first, second and fourth objects, the present invention provides a method for controlling a rotation of a sensorless and brushless DC motor, which comprises the steps of:

(a) entering a command such as a rotational speed of the rotor;

(b) determining a timing schedule for an electrical commutation of the phase coils with respect to the command entered in step (a);

(c) providing a test current to the phase coils according to the timing schedule determined in step (b);

(d) detecting inductance variations of the phase coils;

(e) determining an initial position of the rotor based on the inductance variations detected in step (d);

(f) commutating the phase coils based on the initial position of the rotor determined in step (e), and providing a driving current to the selected phase coils;

(g) detecting a back electromotive force generated from the phase coils or the inductance variations thereof in response to the driving current provided in step (f);

(h) judging whether or not the back electromotive force above a predetermined value is detected and whether or not a pulse signal converted from the detected back electromotive force is synchronized with a control signal;

(i) executing a standstill or low-speed mode operation when it is judged in step (h) that the pulse signal is not synchronized with the control signal, and returning to step (g); and (j) executing a high-speed mode operation when it is judged in step (h) that the pulse signal is synchronized with the control signal, and returning to step (g).

In order to achieve the first, second and fourth objects, the present invention provides an apparatus for controlling a rotation of a sensorless and brushless DC motor, which comprises:

driving means for providing a driving current to each of pairs of the phase coils among a plurality of the phase coils in order to rotate the rotor, and for providing a test current to each of pairs of the phase coils in order to detect a present angular position of the rotor;

first detecting means for detecting a back electromotive force generated from each of pairs of the driven phase coils while the rotor is rotating above a predetermined speed, and for providing a first detection signal;

second detecting means for detecting a test or driving current which flows through each of pairs of the driven phase coils while the rotor is at standstill or is rotating below a predetermined speed, and for providing a second detection signal;

speed detecting means for providing a mode selection signal according to a rotational speed of the rotor in response to the first detection signal from the first detecting means; and control means for providing a low-speed control signal to the driving means in response to the second detection signal from the second detecting means below a predetermined speed on the basis of the mode selection signal from the speed detecting means, and for providing a high-speed control signal to the driving means in response to the first detection signal from the first detecting means above a predetermined speed on the basis of the mode selection signal from the speed detecting means.

In order to achieve the first, third and fourth objects, the present invention provides another method for controlling a rotation of a sensorless and brushless DC motor, which comprises the steps of:

(a) entering a command such as a rotational speed of the rotor;

(b) determining a timing schedule for an electrical commutation of the phase coils with respect to the command entered in step (a);

(c) providing a test current to the phase coils according to the timing schedule determined in step (b);

(d) detecting inductance variations of the phase coils;

(e) determining an initial position of the rotor based on the inductance variations detected in step (d);

(f) commutating the phase coils based on the initial position of the rotor determined in step (e), and providing a driving current to the selected phase coils;

(g) detecting the inductance variations of the phase coils in response to the driving current provided in step (f);

(h) determining a present position of the rotor based on the inductance variations detected in step (g);

(i) providing a relevant driving current to the phase coils based on the timing schedule determined in step (b) and the present position of the rotor determined in step (h); and (j) returning to step (g).

In order to achieve the first, third and fourth objects, the present invention provides another apparatus for controlling a rotation of a sensorless and brushless DC motor, which comprises:

driving means for providing a driving current to each of pairs of the phase coils among a plurality of the phase coils in order to rotate the rotor, and for providing a test current to each of pairs of the phase coils in order to detect a present angular position of the rotor;

voltage detecting means for sequentially detecting a voltage signal corresponding to the test or driving current in a normal or counter direction which flow through each of the pairs of the phase coils, and for providing a detected voltage signal;

clamping and amplifying means for clamping the voltage signal detected by the voltage detecting means down a predetermined level, and for amplifying a clamped signal;

shift and delay means for inputting clamped and amplified signal from the clamping and amplifying means in series with respect to time in response to a clock signal, and for providing the clamped and amplified signal as a digital-level signal in parallel with respect to time.

control means for determining an electrical commutation of the phase coils in response to the parallel signal of the digital level from the shift and delay means, and for controlling the driving means; and clock generating means for generating a clock signal in response to the control signal from the control means in order to be synchronized with the voltage signal detected by the voltage detecting means.

In the control method and apparatus for controlling a rotation of a sensorless and brushless DC motor according to the present invention, although the rotational velocity of the motor varies between low and high velocities, the phase coils of the motor are supplied with an optimal driving current at an optimal point in time under the control of the control section, so that the driving characteristics of the motor are improved. Also, since a signal which is detected depending on the current which flows through the phase coils is converted into the level of a digital signal, the control section correctly recognizes the signal and computes a present angular position of the rotor, so that a reliability of the operation for controlling the rotation of the motor heightens considerably.

BRIEF DESCRIPTION OF THE DRAWINGS

The above objects and other advantages of the present invention will become more apparent by describing in detail preferred embodiments thereof with reference to the attached drawings, in which.

DESCRIPTION OF THE PREFERRED EMBODIMENTS

A description will be given below in detail with reference to accompanying drawings of a configuration and an operation of a method and apparatus for controlling a rotation of a sensorless and brushless DC motor according to embodiments of the present invention.

Figure 2:
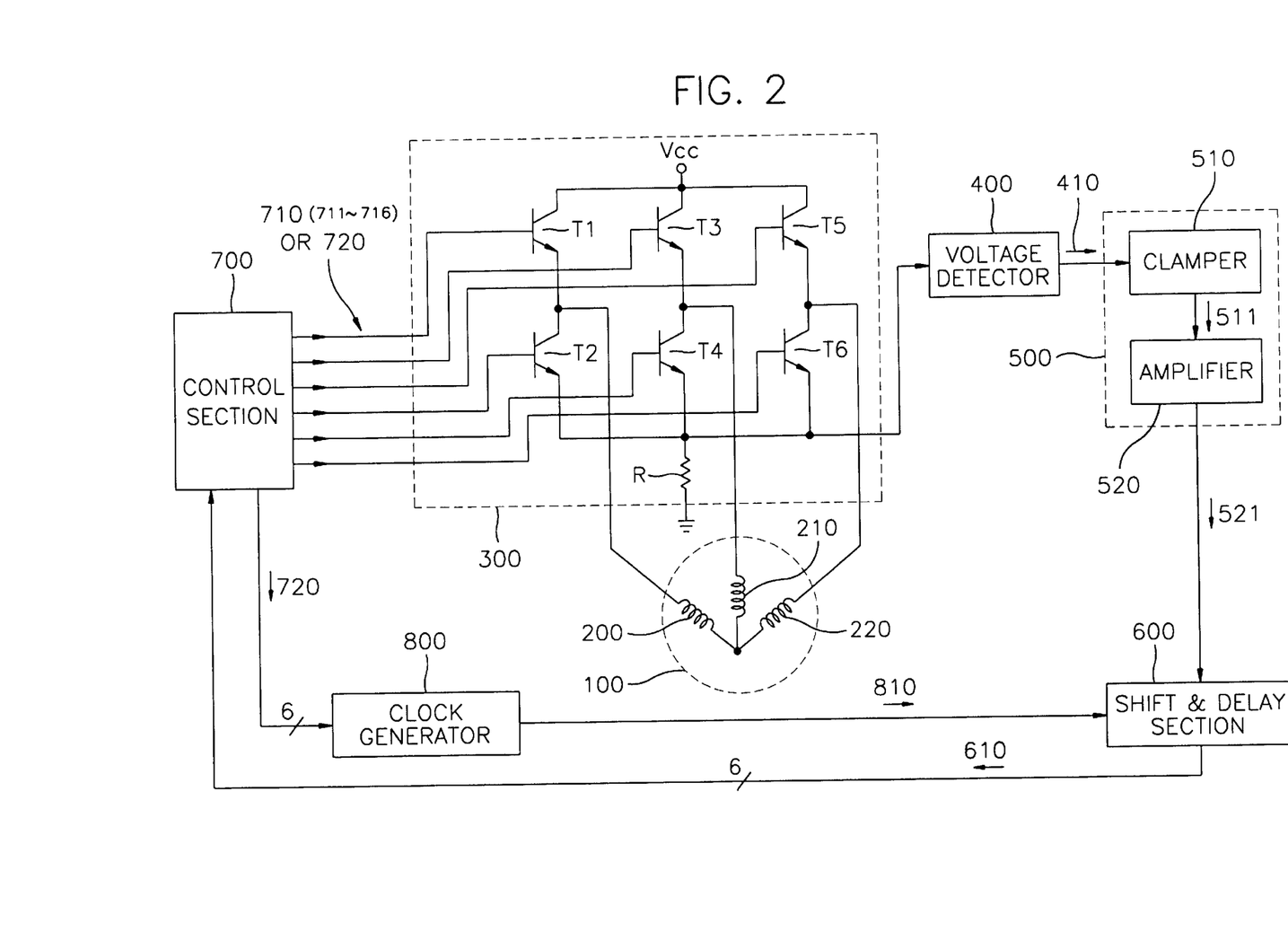
FIG. 2 is a block diagram for showing a circuit configuration of an apparatus for controlling a rotation of a sensorless and brushless DC motor according to an embodiment of the present invention.

FIG. 2 is a block diagram for showing a circuit configuration of an apparatus for controlling a rotation of a sensorless and brushless DC motor according to an embodiment of the present invention. As shown in FIG. 2, the control apparatus comprises a switching-driving section 300, a voltage detector 400, a clamping and amplifying section 500, a shift and delay section 600, a control section 700 and a clock generator 800.

Switching-driving section 300 provides six kinds of driving currents in normal and reverse directions to a pair of phase coils among Y-winding three phase coils 200, 210 and 220 in order to rotate a magnet rotor (not shown) included in a motor 100, and provides test currents to phase coils 200, 210 and 220 in order to detect a present angular position of the rotor.

An embodiment of switching-driving 300 includes first to sixth transistors T1 to T6 and a resistor R which is connected to each of the emitters of first to sixth transistors T1 to T6 to a ground. Conducting paths between first to sixth transistors T1 to T6, first to third phase coils 200, 210 and 220, and resistor R are so formed that a current sequentially flows through a transistor, a pair of the phase coils, another transistor, resistor R and a ground. Here, a pair of transistors which sequentially turn on are T1-T4, T3-T2, T1-T6, T5-T2, T3-T6 and T5-T4.

Voltage detector 400 detects voltage signals corresponding to six test currents or driving currents in a normal or counter direction which flow through all pairs of the phase coils and provides a detected voltage signal 410. Detected voltage signal 410 is measured across resistor R included switching-driving section 300.

Clamping and amplifying section 500 comprises a damper 510 and an amplifier 520. Clamper 510 clamps voltage signal 410 detected by voltage detector 400 down on a predetermined level, and amplifier 520 amplifies a clamped signal 511 to provide an clamped and amplified signal 521.

For example, shift and delay section 600 is composed of flip-flops (see FIG. 3) and each of delay stages of shift and delay section 600 inputs clamped and amplified signal 521 from clamping and amplifying section 500 in series with respect to time in response to a clock signal 810, and converts clamped and amplified signal 521 into a signal 610 of a digital level which is arranged in parallel with respect to time.

Control section 700 inputs parallel signal 610 of the digital level from shift and delay section 600 to determine a present rotational position or an angular position of the rotor, and determines an electrical commutation of phase coils 200, 210 and 220 referring to a predetermined position of the rotor to provide a control signal 710 for controlling turn-on/off of first to sixth transistors which are included in switching-driving section 300.

Control section 700 includes a determining section which is composed of a microprocessor and the like in order to determine the rotor position referring to a look-up table, a logic combination circuit to generate a timing signal for turning on/off transistors T1 to T6, and a pilot signal generator for generating a pilot signal of a short period. Control signal 710 includes first to sixth control signals 711 to 716.

Clock generator 800 generates clock signal 810 which is synchronized with voltage signal 410 detected by voltage detector 400 or control signal 710.

Figure 4:
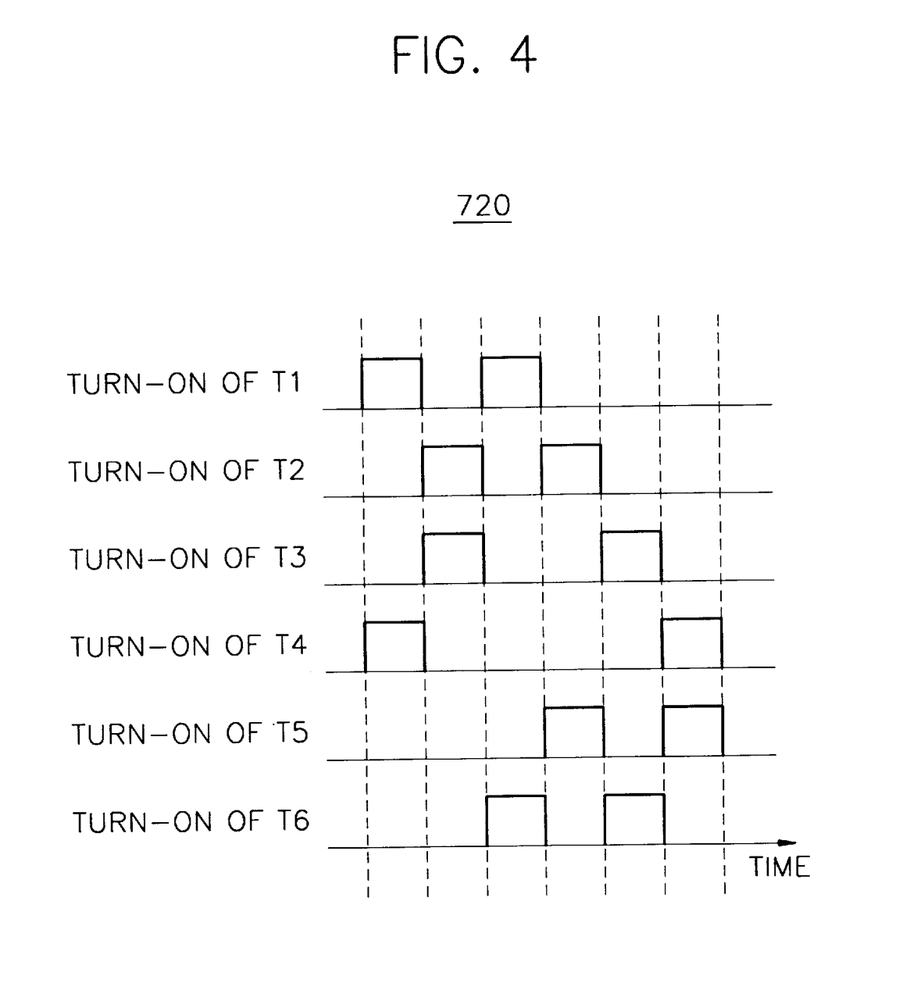
FIG. 4 is a timing chart for showing a waveform of a pilot signal supplied from a control section to a switching-driving section shown in FIG. 2.

Hereinafter, a description of the operation of a method and apparatus for controlling a rotation of a sensorless and brushless DC motor according to an embodiment of the present invention which has the aforementioned configuration, will be provided as follows while referring to the timing charts of FIGS. 4A to 4F.

Figure 5:
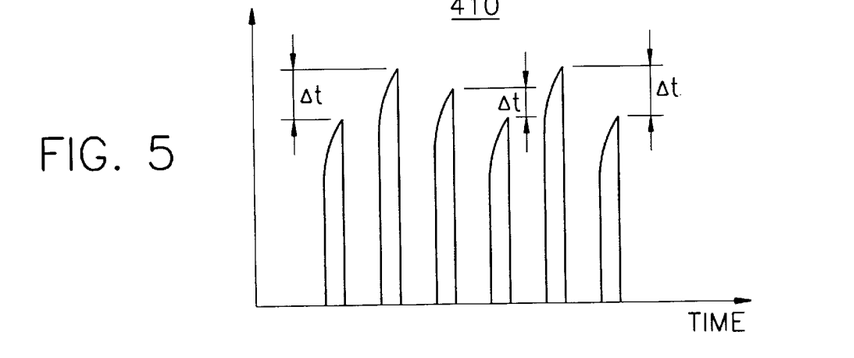
FIG. 5 is a timing chart for showing a waveform of a voltage signal detected by a voltage detector shown in FIG. 2.
Figure 6:
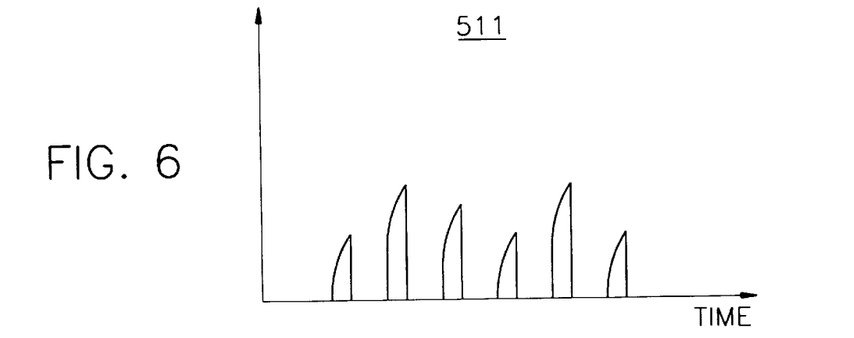
FIG. 6 is a timing chart for showing a waveform of a signal which is processed by a damper of a clamping and amplifying section shown in FIG. 2 which inputs a detected voltage signal shown in FIG. 5.
Figure 7:
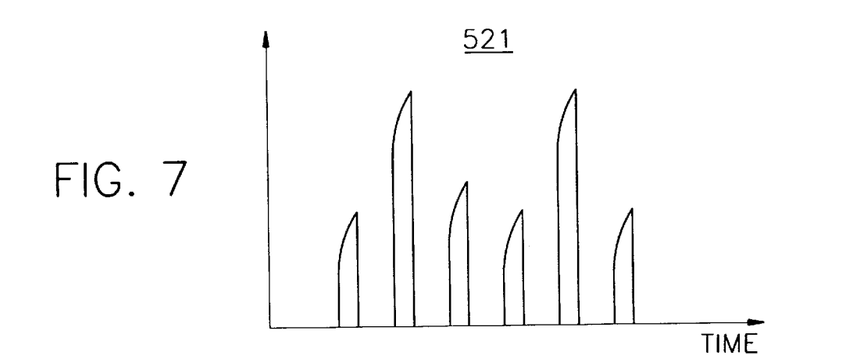
FIG. 7 is a timing chart for showing a waveform of a signal which is amplified by an amplifier of a clamping and amplifying section shown in FIG. 2 which inputs a clamped signal shown in FIG. 6.
Figure 8:
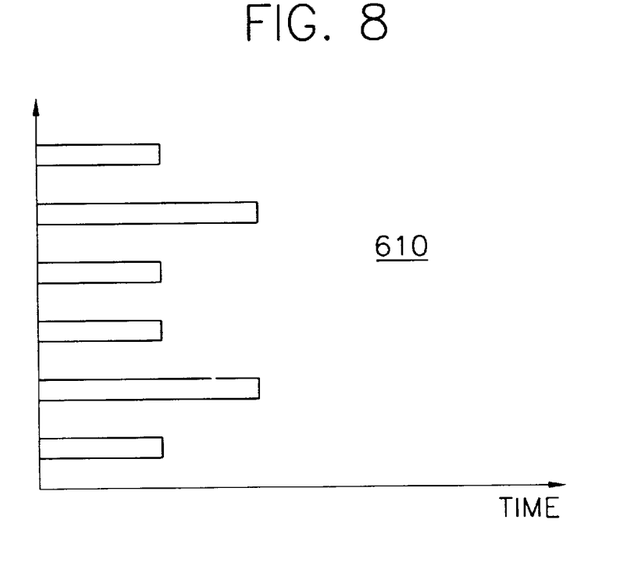
FIG. 8 is a timing chart for showing a waveform of a signal which is processed by a shift and delay section shown in FIG. 2 which inputs an amplified signal shown in FIG. 7.
Figure 9:
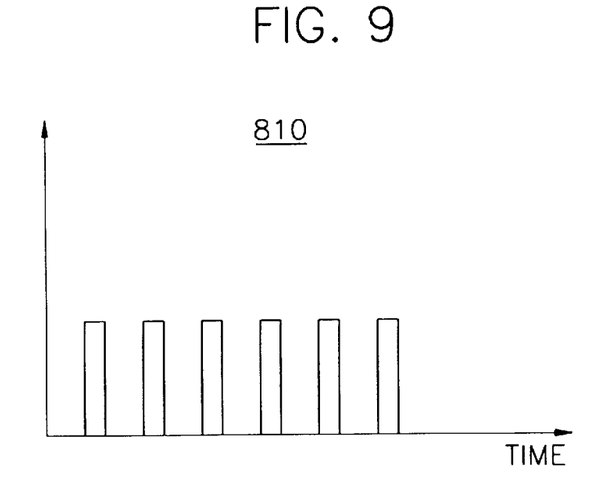
FIG. 9 is a timing chart for showing a waveform of a clock signal which is generated by a clock generator shown in FIG. 2 which inputs the pilot signal shown in FIG. 4.

FIG. 4 is a timing chart for showing a waveform of a pilot signal supplied from a control section to a switching-driving section shown in FIG. 2. FIG. 5 is a timing chart for showing a waveform of a voltage signal detected by a voltage detector shown in FIG. 2. FIG. 6 is a timing chart for showing a waveform of a signal which is processed by a clamper of a clamping and amplifying section shown in FIG. 2 which inputs a detected voltage signal shown in FIG. 5. FIG. 7 is a timing chart for showing a waveform of a signal which is amplified by an amplifier of a clamping and amplifying section shown in FIG. 2 which inputs a clamped signal shown in FIG. 6. FIG. 8 is a timing chart for showing a waveform of a signal which is processed by a shift and delay section shown in FIG. 2 which inputs an amplified signal shown in FIG. 7. FIG. 9 is a timing chart for showing a waveform of a clock signal which is generated by a clock generator shown in FIG. 2 which inputs the pilot signal shown in FIG. 4.

When the pilot signal generator included in control section 700 applies pilot signal 720 to switching-driving section 300, switching-driving section 300 provides the test current to a relevant pair of phase coils of motor 100 and the relevant pair of the phase coils shows a coil characteristic, i.e., an inductance variation of a different slope depending on a position in relation to permanent magnets whose N- and S-poles are alternately arranged at the rotor.

The above characteristic is detected via voltage detector 400 as a voltage which is measured across resistor R included in switching-driving section 300 (see FIG. 5). Detected voltage signal 410 has a small magnitude, and a difference Δt between elements thereof is small, so that detected voltage signal 410 are clamped and amplified by clamping and amplifying section 500 (see FIGS. 4C and 4D). An clamped and amplified signal 521 has a high/low level of a digital signal.

While inputting clamped and amplified signal 521 from clamping and amplifying section 500 in series with respect to time, shift and delay section 600 delays clamped and amplified signal 521, and provides a digital signal which is arranged in parallel with respect to time (see FIG. 8). Then, clamped and amplified signal 521 is shifted and delayed, which corresponds to a memorizing function.

Figure 3:
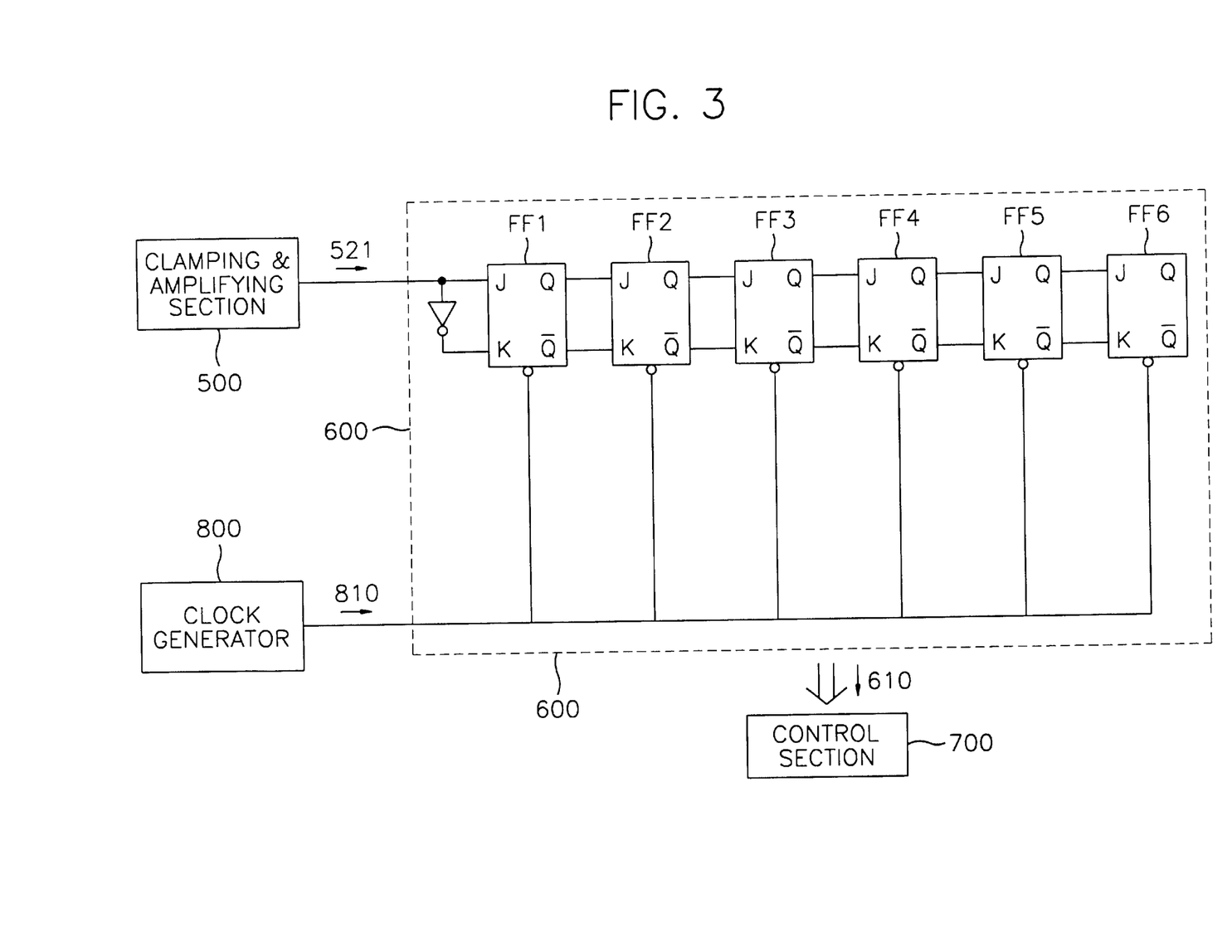
FIG. 3 is a block diagram for showing a circuit configuration of an embodiment of a shift and delay section according to the present invention.

Referring to FIG. 3, in shift and delay section 600, an output value of a first JK flip-flop FF1 is provided to a next stage of a second JK Flip-flop FF2, and then, second JK flip-flop FF2 maintains a present value until a next clock signal 810 is inputted. Thus, until the values of the test currents which flow through all pairs of the phase coils are detected by voltage detector 400, first to sixth JK flip-flops FF1 to FF6 continually shift presently-possessed values thereof to the next stage of the JK flip-flop at every time when clock signal 810 is applied, and a special memory is not necessary. Further, since the digital-level signal 610 is supplied from shift and delay section 600 in parallel with respect to time in response to detected voltage signal 410, i.e., a detected test current, parallel signal 610 of the digital level is available at once without waiting for a completion of a test detection operation. Therefore, for example, a time which is required to execute a test detection function of a head position in a motor of a head drum assembly of a video cassette recorder.

Control section 700 which receives parallel signal 610 of the digital level from shift and delay section 600 applies pilot signal 720 or control signal 730 corresponding to the present position of the rotor to switching-driving section 300.

Since control section 700 have transistors TI to T6 turn on in sequence such as T1-T4, T3-T2, T1-T6, T5-T2, T3-T6 and T5-T4 according to parallel signal 610 of the digital level, clock signal 810 is generated in the same period as voltage signal 410 which is detected based on a combination of pilot signal 720.

While clamped and amplified signal 521 is supplied from amplifying and clamping section 500, when a gain of clamping and amplifying section 500 is so adjusted that a small magnitude thereof is generated below a maximum low level and that a large magnitude thereof is generated above a minimum high level, control section 700 correctly recognizes parallel signal of the digital level 610 to determine a present position of the rotor.

Voltage signal 410 which is detected by voltage detector 400 gives an amplitude and a phase angle shift, and the amplitude and the phase angle shift are different from those of the applied original signal since there are a voltage drop and a phase angle shift due to the internal resistance and inductance of the phase coils. Control section 700 compares these amplitudes and phase angles with the values in a look-up table, and can determines a correct present position of the rotor. This information is fed back to the timing logic section included in control section 700 to commutate the phase coils of the motor. This procedure is applied to the determination of an initial position of the rotor.

Thereafter, control section 700 determines a commutation, i.e., a driving sequence, of the phase coils of motor 100. Control section 700 provides control signal 710 in accordance with a determined commutation and causes motor 100 to rotate at a set rotational speed.

Figure 10:
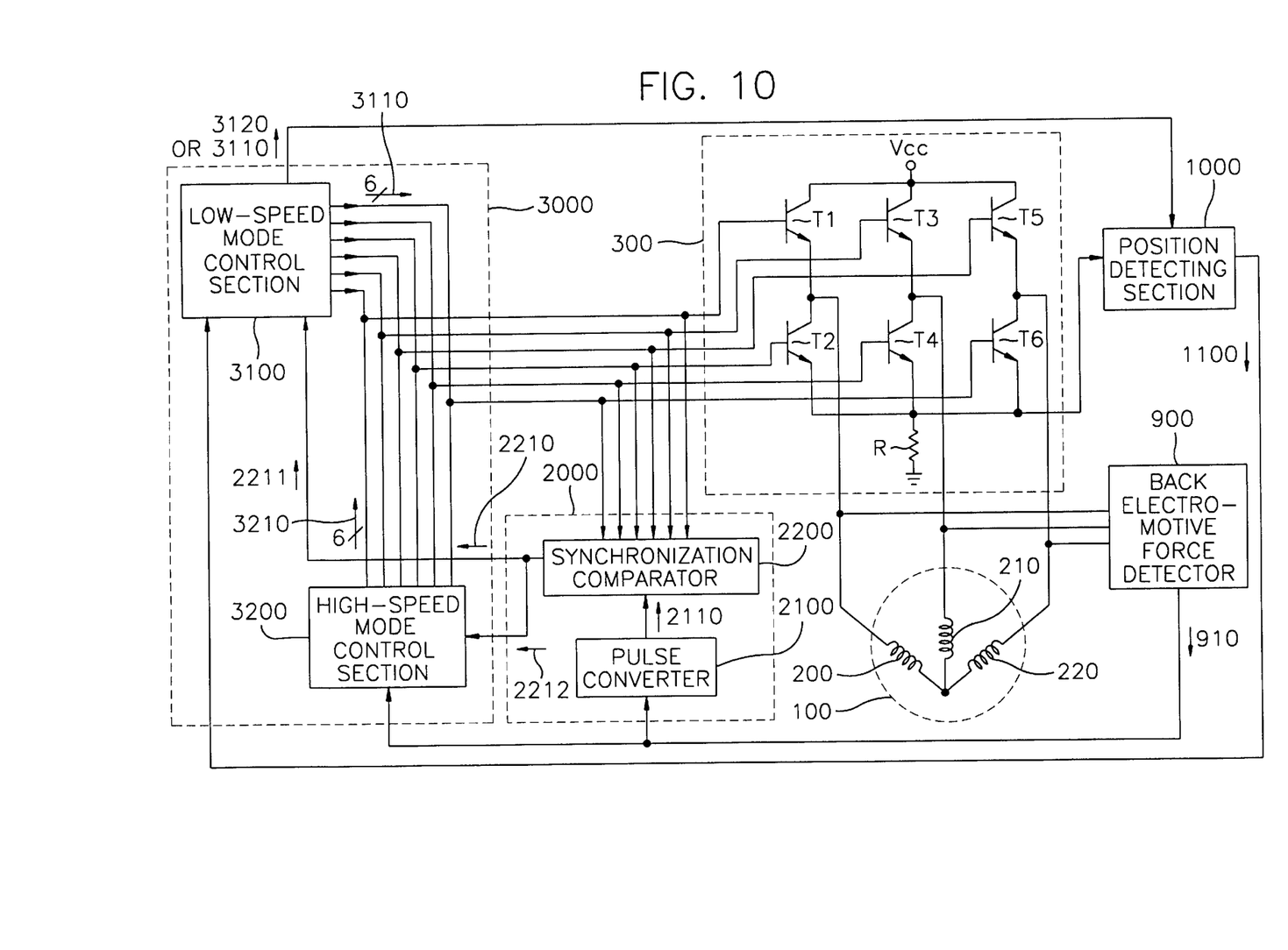
FIG. 10 is a block diagram for showing a circuit configuration of an apparatus for controlling a rotation of a sensorless and brushless DC motor according to another embodiment of the present invention.

FIG. 10 is a block diagram for showing a circuit configuration of an apparatus for controlling a rotation of a sensorless and brushless DC motor according to another embodiment of the present invention. As shown in FIG. 10, the control apparatus comprises a switching-driving section 300, a back electromotive force detector 900, a position detecting section 1000, a speed detecting section 2000 and a control section 3000.

Switching-driving section 300 provides six kinds of driving currents in normal and reverse directions to a pair of phase coils among Y-winding three phase coils 200, 210 and 220 in order to rotate a magnet rotor (not shown) included in a motor 100, and provides test currents to phase coils 200, 210 and 220 in order to detect a present angular position of the rotor.

Back electromotive force detector 900 detects a back electromotive force which is generated from a pair of the driven coils during a high-speed rotation of the rotor, and provides a detected back electromotive force signal 910.

Position detecting section 1000 detects a voltage signal 1100 of a digital level based on a test or driving current which flows through the phase coils while the rotor is at standstill or is rotating at low-speed. Position detecting section 1000 comprises a voltage detector 400, a clamping and amplifying section 500, a shift and delay section 600 and a clock generator 800 which are shown in FIG. 2.

Voltage detector 400 detects voltage signals corresponding to six test currents or driving currents in a normal or counter direction which flow through all pairs of the phase coils and provides a detected voltage signal 410. Detected voltage signal 410 is measured across resistor R included switching-driving section 300.

Clamping and amplifying section 500 comprises a damper 510 and an amplifier 520. Clamper 510 clamps voltage signal 410 detected by voltage detector 400 down on a predetermined level, and amplifier 520 amplifies a clamped signal 511 to provide an clamped and amplified signal 521.

For example, shift and delay section 600 is composed of flip-flops (see FIG. 3) and each of delay stages of shift and delay section 600 inputs clamped and amplified signal 521 from clamping and amplifying section 500 in series with respect to time in response to a clock signal 810, and converts clamped and amplified signal 521 into a signal 1100 of a digital level which is arranged in parallel with respect to time.

Clock generator 800 generates clock signal 810.

Speed detecting section 2000 provides a mode selection signal 2210 according to a rotational speed of the rotor in response to back electromotive force signal 910 detected by back electromotive force detector 900. Speed detector 2000 comprises a pulse converter 2100 and a synchronization comparator 2200.

Pulse converter 2100 converts back electromotive force signal 910 detected by back electromotive force detector 900 into a pulse signal, and provides a pulse signal 2110. Synchronization comparator 2200 judges whether pulse signal 2110 from pulse converter 2100 is synchronized with a control signal or a pilot signal which is supplied from control section 3000 to switching-driving section 300, determines that the present state is in a low-speed mode if the two signals are not synchronized with each other, and provides a low-speed mode selection signal 2211.

Synchronization comparator 2200 determines that the present state is in a high-speed mode if the two signals are synchronized with each other, and provides a high-speed mode selection signal 2212. Mode selection signal 2210 includes low- and high-speed mode selection signals 2211 and 2212.

Control section 3000 comprises a low-speed mode control section 3100 and a high-speed mode control section 3200. Low-speed mode control section 3100 is activated by low-speed mode selection signal 2211 from synchronization comparator 2200, and provides low-speed control signal 3110 to switching-driving section 300 below a prescribed speed in response to parallel signal 1100 of the digital level from position detecting section 1000. High-speed mode control section 3100 is activated by high-speed mode selection signal 2212 from synchronization comparator 2200, and provides high-speed control signal 3210 to switching-driving section 300 above a prescribed speed in response to back electromotive force signal 910 detected by back electromotive force detector 900.

Clock generator 800 which is included in position detecting section 1000 generates clock signal 810 which is synchronized with voltage signal 410 detected by voltage detector 400 or with low-speed control signal 3110 based on pilot signal 3120 from low-speed mode control section 3100 included in control section 3000.

Figure 12:
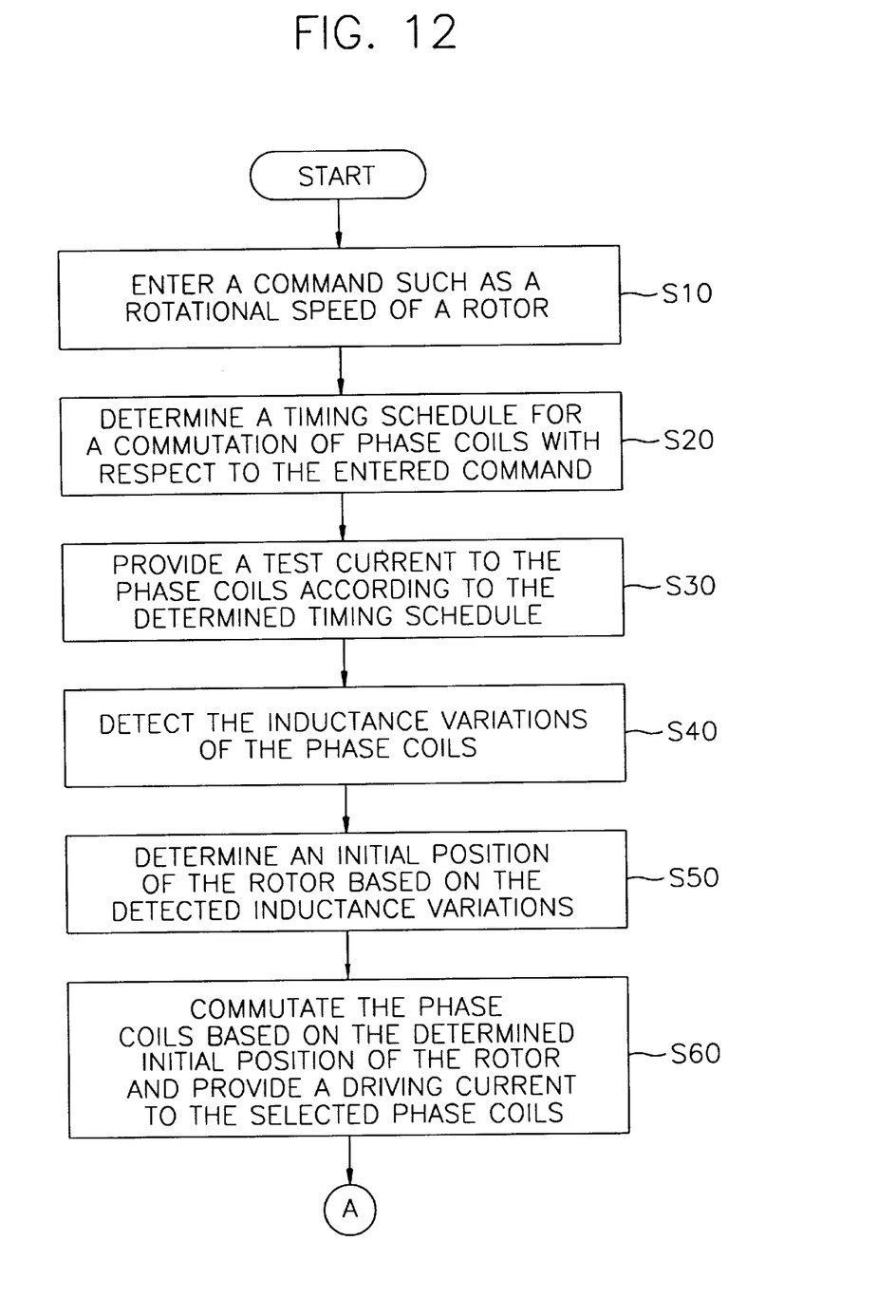
FIGS. 12 and 13 is a flowchart for illustrating a control method executed by a control apparatus shown in FIG. 10.
Figure 13:
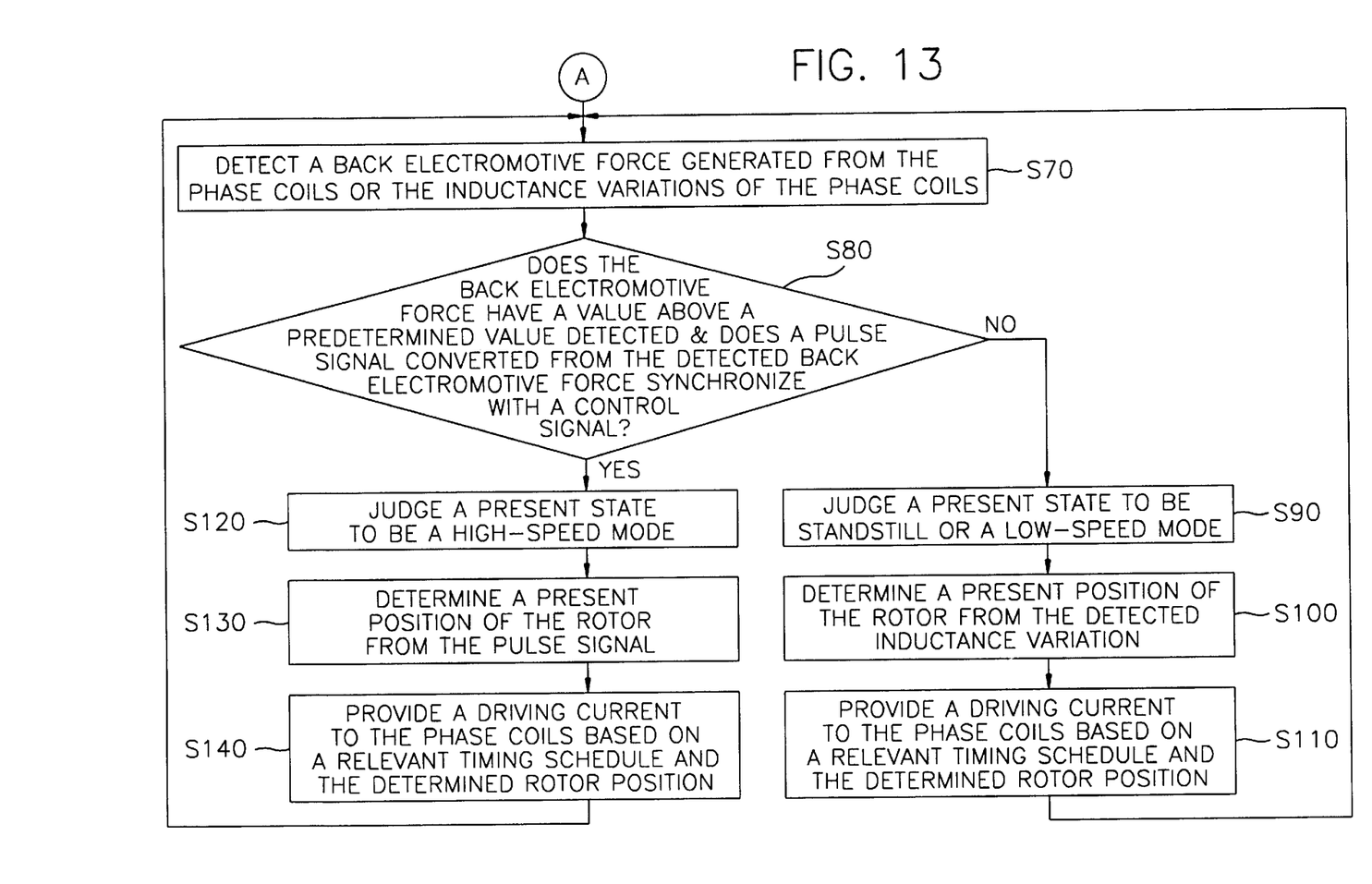

A description will next be made on the procedure of the control method according to another embodiment of the present invention which is executed by the apparatus for controlling a rotation of a motor shown in FIG. 10, in accordance with the flowchart of FIGS. 12 and 13, while referring to the timing charts of FIGS. 6A to 6D.

Figure 11A:
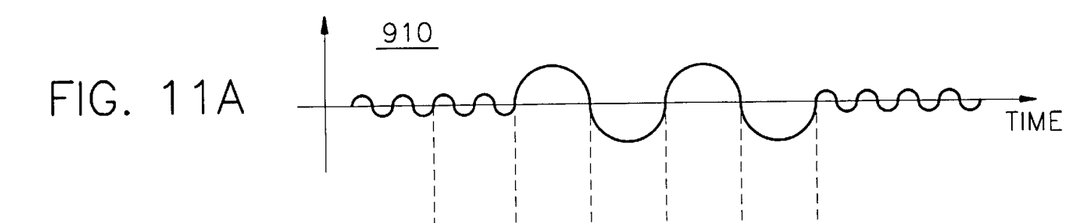
FIG. 11A is a timing chart for showing a waveform of a back electromotive force generated from phase coils shown in FIG. 10.
Figure 11B:
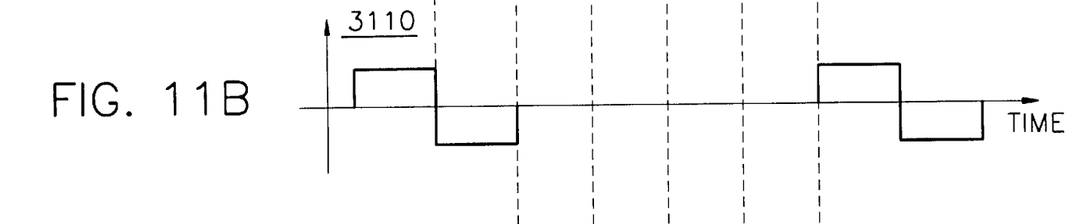
FIG. 11B is a timing chart for showing a waveform of a low-speed control signal supplied from a low-speed mode control section to the switching-driving section shown in FIG. 10.
Figure 11C:
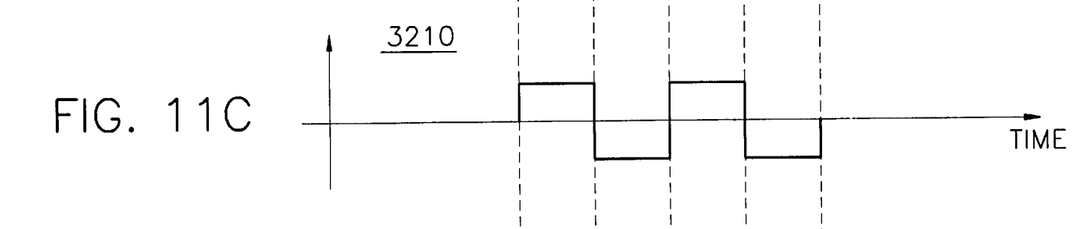
FIG. 11C is a timing chart for showing a waveform of a high-speed control signal supplied from a high-speed mode control section to the switching-driving section shown in FIG. 10.
Figure 11D:
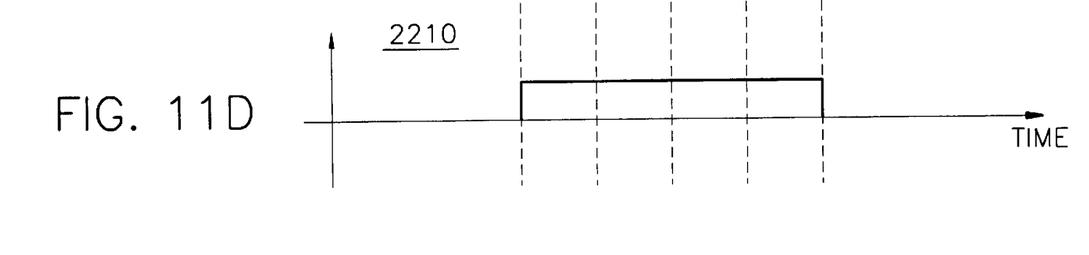
FIG. 11D is a timing chart for showing a waveform of a mode selection signal supplied from a synchronization comparator to a low- or high-speed mode control section shown in FIG. 10.

FIG. 11A is a timing chart for showing a waveform of a back electromotive force generated from phase coils shown in FIG. 10. FIG. 11B is a timing chart for showing a waveform of a low-speed control signal supplied from a low-speed mode control section to the switching-driving section shown in FIG. 10. FIG. 11C is a timing chart for showing a waveform of a high-speed control signal supplied from a high-speed mode control section to the switching-driving section shown in FIG. 10. FIG. 11D is a timing chart for showing a waveform of a mode selection signal supplied from a synchronization comparator to a low- or high-speed mode control section shown in FIG. 10. FIGS. 12 and 13 is a flowchart for illustrating a control method executed by a control apparatus shown in FIG. 10.

For example, in an apparatus such as a video cassette recorder, when a user selects a desired operation mode such as recording, playback, rewinding and the like via operation keys, the user's command such as the rotational speed of sensorless and brushless DC motor 100 included in a head drum assembly and the like is entered into control section 3000 of the video cassette recorder (step S10).

For the command which is entered in step S10, control section 3000 determines a timing schedule for an electrical commutation of phase coils 200, 210 and 220 which are included in motor 100 (step S20).

While control section 3000 provides the pilot signal to switching-driving section 300 according to the timing schedule determined in step S20, switching-driving section 300 provides the test currents in a normal or counter direction to all pairs of the phase coils (step S30).

In response to the test current which is provided in step S30, position detecting section 1000 detects a voltage which is measured across resistor R. The amplitude and a phase shift of the detected test current, i.e., detected voltage signal 410 (see FIG. 2), are varied due to the inductance variation of the phase coils. Position detecting section 1000 clamps and amplifies detected voltage signal 410. Clamped and amplified signal 1100 is sequentially inputted into shift and delay section 600, and is converted into digital-level signal 1100 whose signal elements are arranged in parallel with respect to time (step S40).

Control section 3000 determines an initial position of the rotor based on parallel signal 1100 of the digital level which is converted in step S40 (step S50).

Based on the initial position of the rotor which is determined in step S50, control section 3000 commutates phase coils 200, 210 and 220 via switching-driving section 300 to provide driving currents to selected pairs of the phase coils (step S60).

Back electromotive force detector 900 detects a back electromotive force (see FIG. 11A) which is generated from a pair of the presently-driven phase coils in response to the driving current which is provided in step S60, and position detecting section 1000 detects the inductance variation of the driven phase coils as parallel signal 1100 of the digital level (see FIG. 8) according to a procedure described in step S40 (step S70).

Back electromotive force signal 910 which is detected in step S70 is converted into pulse signal 2110 by pulse converter 2100 and pulse signal 2110 is provided to synchronization comparator 2200. Synchronization comparator 2200 compares pulse signal 2110 with control signal 3110 or 3210 supplied from control section 3000 to switching-driving section 300 and judges the synchronization between the two signals (step S80).

When the rotor is at standstill or rotates at a low-speed, since the back electromotive force is not generated from the phase coils or the signal level thereof is small (see FIG. 11A) although the back electromotive force is generated, only the control signal is inputted into comparator 2200. Namely, when it is judged in step S80 that pulse signal 2110 is not synchronized with the control signal, synchronization comparator 2200 judges that a present state is at standstill or in the low-speed rotation mode, and applies low-speed mode selection signal 2211 (see FIG. 11D) to low-speed mode control section 3100 (step S90).

Therefore, low-speed mode control section 3100 determines a present rotational position of the rotor, i.e., an angular position, based on the parallel signal 1100 of the digital level which is detected in step S70 (step S100).

Based on the timing schedule determined in step S20 and on the present position of the rotor determined in step S100, low-speed mode control section 3100 applies low-speed control signal 3110 (see FIG. 11B) to switching-driving section 300, and causes switching-driving section 300 to provide driving currents to selected pairs of the phase coils (step S110). Hereafter, the procedure returns to step S70.

Meanwhile, when the rotor rotates at a high-speed, since the back electromotive force is generated from the phase coils with a signal level above a predetermined value, and back electromotive force signal 910 detected by back electromotive force detector 900 normally operates pulse converter 2100 to provide pulse signal 2110 which has a large signal level. Namely, when it is judged in step S80 that pulse signal 2110 is synchronized with the control signal, synchronization comparator 2200 judges that a present state is in the high-speed mode, and applies high-speed mode selection signal 2212 to high-speed mode control section 3200 (step S120).

Consequently, high-speed mode control section 3200 determines a present rotational position of the rotor based on back electromotive force signal 910 which is detected in step S70 (step S130).

Based on the timing schedule determined in step S20 and on the present position of the rotor determined in step S130, high-speed mode control section 3100 applies high-speed control signal 3210 (see FIG. 11C) to switching-driving section 300, and causes switching-driving section 300 to provide driving currents to selected pairs of the phase coils (step S140). Hereafter, the procedure returns to step S70.

In the method and apparatus for controlling a rotation of a sensorless and brushless DC motor according to an embodiment of the present invention, when six kinds of the test currents are provided to all pairs of the phase coils in order to determine a present angular position of the rotor, the variations in the amplitude and in phase angle shift of the test currents caused by the inductance variations are detected by the voltage detector. The detected voltage signal is clamped and amplified and the elements of the detected voltage signal have the high/low level of the digital signals, so that amplitude difference between the elements of the detected voltage signal are clearly discriminated. Therefore, the control section correctly recognizes the signal and computes a present angular position of the rotor, so that a reliability of the operation for controlling the rotation of the motor heightens considerably.

Further, since a shift and delay circuit is used in order to store the detected voltage signal, compared with a conventional apparatus for controlling the rotation of the motor which includes expensive memory devices, a unit cost of manufacturing the control apparatus is cut down.

In the method and apparatus for controlling a rotation of a sensorless and brushless DC motor according to another embodiment of the present invention, when the rotor rotates below a prescribed speed, the low-speed mode control section is activated by the synchronization comparator, whereas when the rotor rotates above the prescribed speed, the low-speed mode control section is activated, so that both the operation for determining a present position of the rotor and the operation for controlling the driving of the motor are performed depending on a rotational speed of the rotor. Consequently, although the rotational velocity of the motor varies between low and high velocities, the phase coils of the motor are supplied with an optimal driving current at an optimal point in time under the control of the control section, so that the driving characteristics of the motor are improved.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method for controlling a rotation of a sensorless and brushless DC motor which includes a stator having a plurality of phase coils and a rotor having a plurality of permanent magnets whose N- and S-poles are alternately arranged, said method comprising the steps of:

(a) entering a command of a rotational speed of said rotor;

(b) determining a timing schedule for an electrical commutation of said phase coils with respect to the command entered in step (a);

(c) providing a test current to said phase coils according to the timing schedule determined in step (b);

(d) detecting inductance variations of said phase coils;

(e) determining an initial position of said rotor based on the inductance variations detected in step (d);

(f) commutating said phase coils based on the initial position of said rotor determined in step (e), and providing a driving current to said selected phase coils;

(g) detecting a back electromotive force generated from said phase coils or the inductance variations thereof in response to the driving current provided in step (f);

(h) judging whether or not the back electromotive force above a predetermined value is detected and whether or not a pulse signal converted from the detected back electromotive force is synchronized with a control signal;

(i) executing a standstill or low-speed mode operation when it is judged in step (h) that the pulse signal is not synchronized with the control signal, and returning to step (g); and (j) executing a high-speed mode operation when it is judged in step (h) that the pulse signal is synchronized with the control signal, and returning to step (g).

2. The method for controlling a rotation of a sensorless and brushless DC motor as claimed in claim 1, wherein said step (e) includes the substeps of:

comparing, with values in a look-up table, amplitudes and phase angles of voltage signals detected from currents flowing through the phase coils in order to determine the initial position of the rotor.

3. The method for controlling a rotation of a sensorless and brushless DC motor as claimed in claim 1, wherein said step (i) comprises the substeps of:

(i-1) judging that a present state is a standstill or low-speed mode when it is judged in step (h) that the pulse signal is not synchronized with the control signal;

(i-2) determining a present position of said rotor from the inductance variations detected in step (g); and (i-3) providing a relevant driving current to said phase coils based on the timing schedule determined in step (b) and on the present position of said rotor determined in step (i-2).

4. The method for controlling a rotation of a sensorless and brushless DC motor as claimed in claim 3, wherein said step (i-2) includes the substeps of:

comparing, with values in a look-up table, amplitudes and phase angles of voltage signals detected from currents flowing through the phase coils in order to determine the present position of the rotor.

5. The method for controlling a rotation of a sensorless and brushless DC motor as claimed in claim 1, wherein said step (j) comprises the substeps of:

(j-1) judging that a present state is a high-speed mode when it is judged in step (h) that the pulse signal is not synchronized with the control signal;

(j-2) determining a present position of said rotor from the pulse signal; and (j-3) providing a relevant driving current to said phase coils based on the timing schedule determined in step (b) and on the present position of said rotor determined in step (j-2).

6. The method for controlling a rotation of a sensorless and brushless DC motor as claimed in claim 1, wherein said detecting inductance variations comprises the substeps of:

detecting in sequence a voltage signal corresponding to the driving current which flows through each of pairs of said phase coils in a normal or counter direction;

clamping the detected voltages down a predetermined level and amplifying the clamped signals; and inputting the amplified signals in sequence and series in response to a clock signal, and outputting digital-level signals in parallel.

7. A method for controlling a rotation of a sensorless and brushless DC motor which includes a stator having a plurality of phase coils and a rotor having a plurality of permanent magnets whose N- and S-poles are alternately arranged, said method comprising the steps of:

(a) entering a command of a rotational speed of said rotor;

(b) determining a timing schedule for an electrical commutation of said phase coils with respect to the command entered in step (a);

(c) providing a test current to said phase coils according to the timing schedule determined in step (b);

(d) detecting inductance variations of said phase coils;

(e) determining an initial position of said rotor based on the inductance variations detected in step (d);

(f) commutating said phase coils based on the initial position of said rotor determined in step (e), and providing a driving current to said selected phase coils;

(g) detecting the inductance variations of said phase coils in response to the driving current provided in step (f);

(h) determining a present position of said rotor based on the inductance variations detected in step (g);

(i) providing a relevant driving current to said phase coils based on the timing schedule determined in step (b) and the present position of said rotor determined in step (h); and (j) returning to step (g).

8. The method for controlling a rotation of a sensorless and brushless DC motor as claimed in claim 7, wherein said detecting inductance variations comprises the substeps of:

detecting in sequence a voltage signal corresponding to the driving current which flows through each of pairs of said phase coils in a normal or counter direction;

clamping the detected voltages down a predetermined level and amplifying the clamped signals; and inputting the amplified signals in sequence and series in response to a clock signal, and outputting digital-level signals in parallel.

9. The method for controlling a rotation of a sensorless and brushless DC motor as claimed in claim 7, wherein said determining a position of the rotor based on the inductance variations includes the substeps of:

comparing, with values in a look-up table, amplitudes and phase angles of voltage signals detected from currents flowing through the phase coils in order to determine the position of the rotor.

10. An apparatus for controlling a rotation of a sensorless and brushless DC motor which includes a stator having a plurality of phase coils and a rotor having a plurality of permanent magnets whose N- and S-poles are alternately arranged, said apparatus comprising:

driving means for providing a driving current to each of pairs of said phase coils among a plurality of said phase coils in order to rotate said rotor, and for providing a test current to each of pairs of said phase coils in order to detect a present angular position of said rotor;

first detecting means for detecting a back electromotive force generated from each of pairs of said driven phase coils while said rotor is rotating above a predetermined speed, and for providing a first detection signal;

second detecting means for detecting a test or driving current which flows through each of pairs of said driven phase coils while said rotor is at standstill or is rotating below a predetermined speed, and for providing a second detection signal;

speed detecting means for providing a mode selection signal according to a rotational speed of said rotor in response to the first detection signal from said first detecting means; and control means for providing a low-speed control signal to said driving means in response to the second detection signal from said second detecting means below a predetermined speed on the basis of the mode selection signal from said speed detecting means, and for providing a high-speed control signal to said driving means in response to the first detection signal from said first detecting means above a predetermined speed on the basis of the mode selection signal from said speed detecting means.

11. The apparatus for controlling a rotation of a sensorless and brushless DC motor as claimed in claim 10, wherein said speed detecting means comprises:

pulse converting means for converting the first detection signal from said first detecting means into a pulse signal; and comparing means for determining that the present state is in a low-speed mode if the pulse signal from said pulse converting means is not synchronized with the control signal from said control means to provide a low-speed mode selection signal, and for determining that the present state is in a high-speed mode if the pulse signal from said pulse converting means is synchronized with the control signal from said control means to provide a high-speed mode selection signal.

12. The apparatus for controlling a rotation of a sensorless and brushless DC motor as claimed in claim 10, wherein said second detecting means comprises:

voltage detecting means for sequentially detecting a voltage signal corresponding to the test or driving current in a normal or counter direction which flow through each of the pairs of said phase coils, and for providing a detected voltage signal;

clamping and amplifying means for clamping the voltage signal detected by said voltage detecting means down a predetermined level, and for amplifying a clamped signal;

clock generating means for generating a clock signal in response to the control signal from said control means in order to be synchronized with the voltage signal detected by said voltage detecting means; and shift and delay means for inputting clamped and amplified signal from said clamping and amplifying means in series with respect to time in response to a clock signal, and for providing the clamped and amplified signal as a digital-level signal in parallel with respect to time.

13. An apparatus for controlling a rotation of a sensorless and brushless DC motor which includes a stator having a plurality of phase coils and a rotor having a plurality of permanent magnets whose N- and S-poles are alternately arranged, said apparatus comprising:

driving means for providing a driving current to each of pairs of said phase coils among a plurality of said phase coils in order to rotate said rotor, and for providing a test current to each of pairs of said phase coils in order to detect a present angular position of said rotor;

voltage detecting means for sequentially detecting a voltage signal corresponding to the test or driving current in a normal or counter direction which flow through each of the pairs of said phase coils, and for providing a detected voltage signal;

clamping and amplifying means for clamping the voltage signal detected by said voltage detecting means down a predetermined level, and for amplifying a clamped signal;

shift and delay means for inputting clamped and amplified signal from said clamping and amplifying means in series with respect to time in response to a clock signal, and for providing the clamped and amplified signal as a digital-level signal in parallel with respect to time;

control means for determining an electrical commutation of said phase coils in response to the parallel signal of the digital level from said shift and delay means, and for controlling said driving means; and clock generating means for generating a clock signal in response to the control signal from said control means in order to be synchronized with the voltage signal detected by said voltage detecting means.

14. A method for controlling a rotation of a sensorless and brushless DC motor which includes a stator having a plurality of phase coils and a rotor having a plurality of permanent magnets whose N- and S-poles are alternately arranged, said method comprising the steps of:

(a) entering a command of a rotational speed of said rotor;

(b) determining a timing schedule for an electrical commutation of said phase coils with respect to the command entered in step (a);

(c) providing a test current to said phase coils according to the timing schedule determined in step (b);

(d) detecting inductance variations of said phase coils;

(e) determining an initial position of said rotor based on the inductance variations detected in step (d);

(f) commutating said phase coils based on the initial position of said rotor determined in step (e), and providing a driving current to said selected phase coils;

(g) detecting a back electromotive force generated from said phase coils or the inductance variations thereof in response to the driving current provided in step (f);

(h) judging whether or not the back electromotive force above a prescribed value is detected and whether or not a pulse signal converted from the detected back electromotive force is synchronized with a control signal;

(i) judging that a present state is a standstill or low-speed mode when it is judged in step (h) that the pulse signal is not synchronized with the control signal;

(j) determining a present position of said rotor from the inductance variations detected in step (g);

(k) providing a relevant driving current to said phase coils based on the timing schedule determined in step (b) and on the present position of said rotor determined in step (j), and returning to step (g);

(l) judging that a present state is a high-speed mode when it is judged in step (h) that the pulse signal is not synchronized with the control signal;

(m) determining a present position of said rotor from the pulse signal; and (n) providing a relevant driving current to said phase coils based on the timing schedule determined in step (b) and on the present position of said rotor determined in step (m), and returning to step (g).

15. The method for controlling a rotation of a sensorless and brushless DC motor as claimed in claim 14, wherein said detecting inductance variations comprises the substeps of:

detecting in sequence a voltage signal corresponding to the driving current which flows through each of pairs of said phase coils in a normal or counter direction;

clamping the detected voltages down a predetermined level and amplifying the clamped signals; and inputting the amplified signals in sequence and series in response to a clock signal, and outputting digital-level signals in parallel.

16. The method for controlling a rotation of a sensorless and brushless DC motor as claimed in claim 14, wherein said determining a position of the rotor based on the inductance variations includes the substeps of:

comparing, with values in a look-up table, amplitudes and phase angles of voltage signals detected from currents flowing through the phase coils in order to determine the position of the rotor.

17. An apparatus for controlling a rotation of a sensorless and brushless DC motor which includes a stator having a plurality of phase coils and a rotor having a plurality of permanent magnets whose N- and S-poles are alternately arranged, said apparatus comprising:

driving means for providing a driving current to each of pairs of said phase coils among a plurality of said phase coils in order to rotate said rotor, and for providing a test current to each of pairs of said phase coils in order to detect a present angular position of said rotor;

back electromotive force detecting means for detecting a back electromotive force generated from each of pairs of said driven phase coils while said rotor is rotating above a predetermined speed;

voltage detecting means for sequentially detecting a voltage signal corresponding to the test or driving current in a normal or counter direction which flow through each of the pairs of said phase coils, and for providing a detected voltage signal;

clamping and amplifying means for clamping the voltage signal detected by said voltage detecting means down a predetermined level, and for amplifying a clamped signal;

shift and delay means for inputting clamped and amplified signal from said clamping and amplifying means in series with respect to time in response to a clock signal, and for providing the clamped and amplified signal as a digital-level signal in parallel with respect to time;

pulse converting means for converting the back electromotive force signal detected by said first detecting means into a pulse signal;

comparing means for determining that the present state is in a low-speed mode if the pulse signal from said pulse converting means is not synchronized with the control signal from said control means to provide a low-speed mode selection signal, and for determining that the present state is in a high-speed mode if the pulse signal from said pulse converting means is synchronized with the control signal from said control means to provide a high-speed mode selection signal;

control means for providing a low-speed control signal to said driving means in response to the parallel signal of the digital level from said shift and delay means below a predetermined speed on the basis of the low-speed mode selection signal from said synchronization comparing means, and for providing a high-speed control signal to said driving means in response to the back electromotive force signal detected by said back electromotive force detecting means above a predetermined speed on the basis of the high-speed mode selection signal from said synchronization comparing means; and clock generating means for generating a clock signal in response to the control signal from said control means in order to be synchronized with the voltage signal detected by said voltage detecting means.

\* \* \* \* \*